April 9, 1968 R. COLOMBO 3,376,603
APPARATUS FOR MANUFACTURING SYNTHETIC TEXTILE FIBERS
Filed May 20, 1966 2 Sheets-Sheet 1
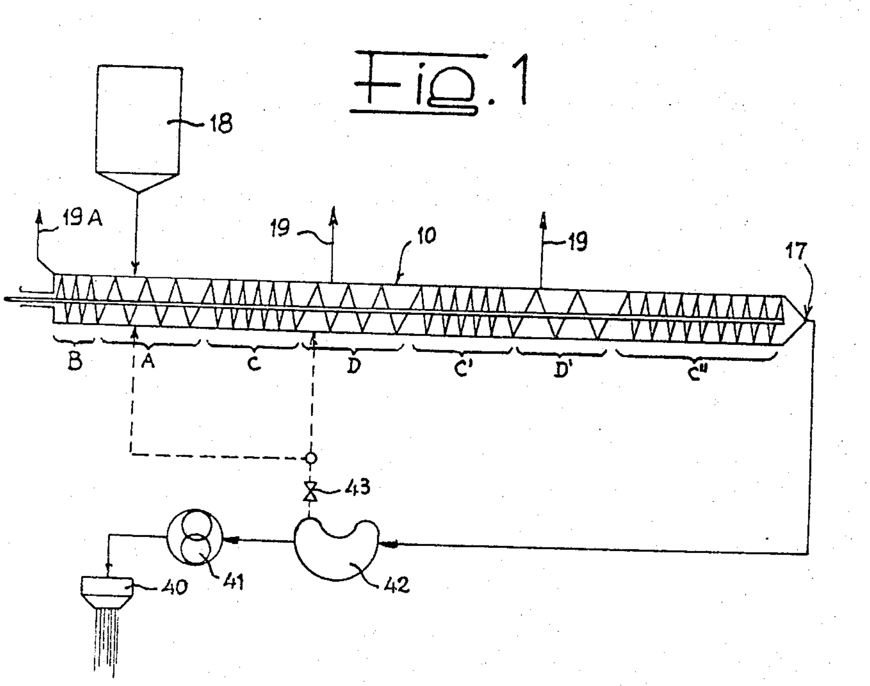
Fig. 1
Fig. 2
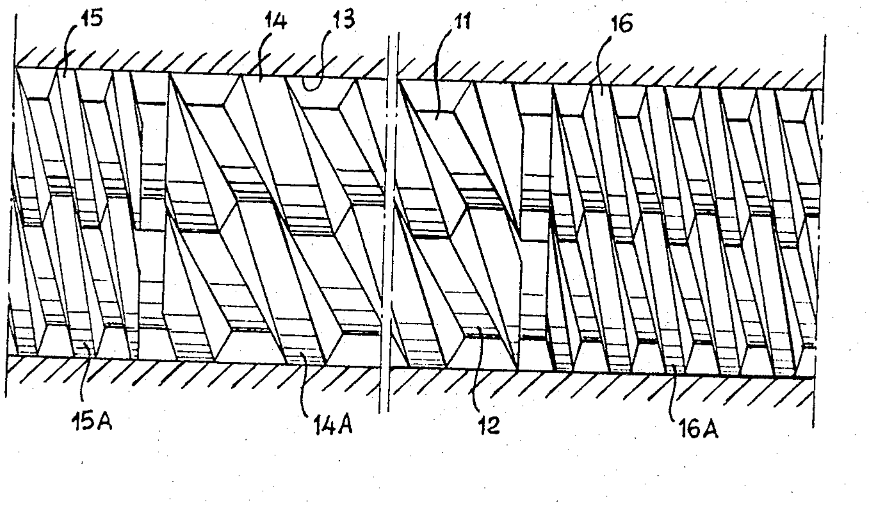

APPARATUS FOR MANUFACTURING SYNTHETIC TEXTILE FIBERS
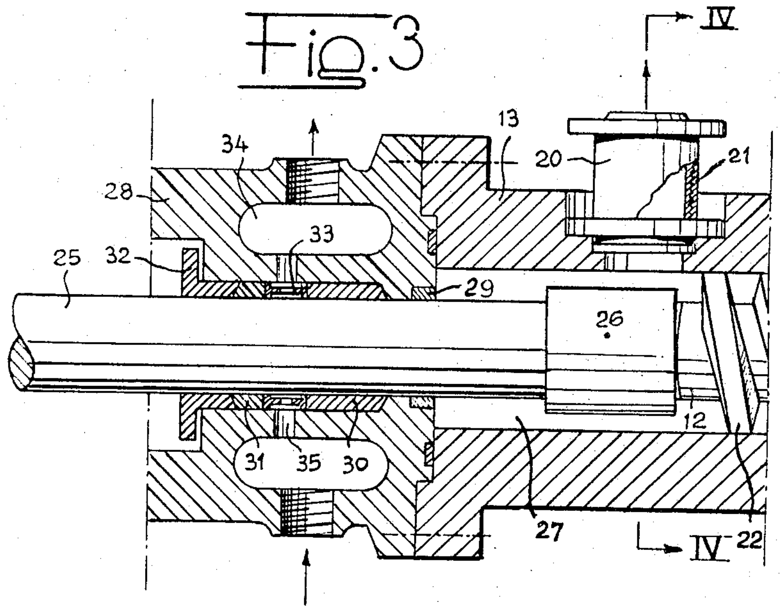
Fig. 3
Fig. 4
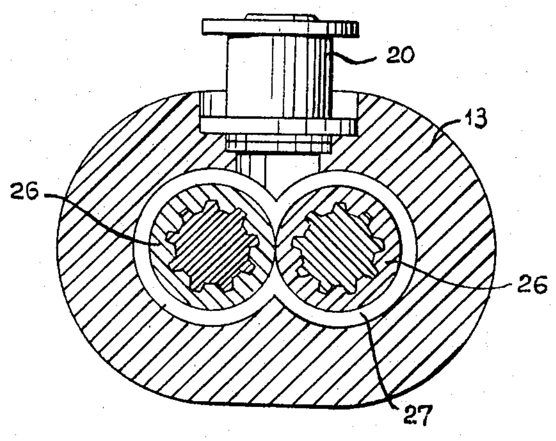

United States Patent Office 3,376,603

Patented Apr. 9, 1968

1

3,376,603

APPARATUS FOR MANUFACTURING SYNTHETIC TEXTILE FIBERS

Roberto Colombo, Turin, Italy, assignor to Lavorazione Materie Plastiche L.M.P. S.p.A., Turin, Italy Filed May 20, 1966, Ser. No. 551,799
1 Claim. (Cl. 18—8)

ABSTRACT OF THE DISCLOSURE

A screw type extruding apparatus having a feed section and at least one decompression and compression stage intermediate said feed section and the die of said extruder with vacuum exhaust means being connected to each of said feed section and decompression sections. A metering pump is provided for feeding the extruded melt to a spinneret and a volume-compensating chamber is interposed between said metering pump and said die with connecting means for directing excessive melt back to either the feed sections or decompression sections of said extruder.

This invention relates to the manufacture of textile fibers by melting and spinning a linear thermoplastic polymer, the term polymer being employed herein in its broadest sense including homopolymers and copolymers of various types.

Apparatus employed at present for manufacturing such fibers usually comprise a spinneret, a measuring pump for supplying molten polymer to the spinneret from a melting device, and one degasifying device at least interposed between the melting device and measuring pump.

As is well known, an accurate degasification of the molten polymer is of the utmost importance to the standard of the end product; however, it implies the use of clumsy, expensive apparatus and a considerable expenditure for power and work, apart from the frequent necessity of having at least two or three such apparatus available in cascade connection for the sake of a satisfactory extent of degasification.

It has now been found that an apparatus as defined above for manufacturing textile fibers can be considerably simplified and a thorough degasification can be obtained by employing for the purpose an extrusion press of the screw type meeting specific requirements.

Accordingly, this invention provides an apparatus of the above defined type, wherein the degasifying device comprises a screw press having the following features: (a) the screws closely interengage and rotate in the same sense in a common barrel in sealing conditions against leakage of material; (b) the feed section of the press is arranged intermediate the barrel length, (c) at least one decompression section is provided in the barrel intermediate the extrusion die and feed section and is connected to a suction source and followed by a compression section; (d) the rear end of the barrel is likewise connected to a suction source.

On the accompanying drawings:

FIGURE 1 diagrammatically shows an embodiment of this invention;

FIGURE 2 is a horizontal axial sectional view of an intermediate section of the twin-screw press barrel employed according to FIG. 1;

FIGURE 3 is a vertical axial sectional part view of the rear end portion of the press;

FIGURE 4 is a cross sectional view on line IV—IV of FIG. 3.

The apparatus shown on the drawings comprises an extrusion press 10 having two closely intermeshing screws 11, 12 which sealingly rotate in the same sense in a common barrel 13 (FIGURE 2). The screws 11, 12 each comprise steep-pitched sections 14, 14A, respectively, alternating with low-pitched sections 15, 16; 15A, 16A, respectively, the various sections of one screw meshing with their respective companion-sections of the other screw. Each section may be of constant or variable pitch; the same applies to the thread thickness. For instance, it may be preferable for the steep-pitched sections to effect a gradual reduction of the cross sectional area for the flow of material in a direction towards the die 17 (FIG. 1) of the press. Moreover, it is advantageous for the low-pitched sections to intermesh in a substantially tight manner, which is, conversely, of small importance in respect of the intermeshing of the low-pitched sections. With this arrangement the inside of the barrel of the press 10, FIG. 1, is subdivided into three compression sections C, C′ C″ (low-pitched sections) and two decompression sections D, D′ (steep-pitched sections) interposed between the former. The first compression section C is preceded by a feed section A, which is preceded in turn by a guard section B. The sections A, B do not substantially differ from the sections D, C, respectively, in respect of the thread pitch. In other words, the threads in section A are steep-pitched, whereas the threads in the section B are low-pitched. Molten polymer is fed to the section A from a melting device 18 sealingly connected with the inlet to the section A. A suction conduit 19 extends from each decompression section D, D′ and is connected with a source of vacuum (not shown); a further suction conduit 19A extends from the rear end of the barrel and is connected to a source of vacuum (not shown) preferably separate from the first mentioned source. It is understood that the press barrel is provided with a heating jacket (not shown) of any known type, provided it is controllable in operation so as to maintain the polymer in the barrel at the desired temperature. Moreover, it is advantageous for the region at which the conduits 19, 19A merge into each other to be heated so as to avoid a possible condensation of vapours. In FIGURES 3 and 4 the connection 20 to the conduit 19A is visible, this connection being surrounded by an electric resistor heating jacket 21. Accidental penetration of molten polymer into the connection 20 is prevented by the low-pitched threads at the guard section B; in FIGURE 3 a rear section of the guard thread 22 in the screw 12 is visible. The screws are each driven from a shaft 25 through a connector 26 situated in the space 27 behind its respective guard thread, into which the suction connection 20 opens. Both shafts extend through a casing 28 sealingly attached to the rear end of the barrel 3, enclosing the seals for both shafts. The two sealing units each comprises a preliminary seal 29 and a main sealing unit. The latter comprises sealing members 30, 31 of asbestos braid impregnated with a low fluorocarbon polymer such as polytetrafluoroethylene, with a stuffing gland 32 and a spacer ring 33 interposed between the two sealing members 30, 31. The spacer ring is of I or double T-shaped profile, the wings of which bear against the two sealing members, the web being formed with a circular series of radial holes. The region of the main sealing unit is surrounded in the casing 28 by a cooling jacket 34 connecting through apertures 35 with the annular space enclosing the spacer ring 33. By supplying cool water to the jacket 34 the whole main sealing unit is efficiently cooled, and through the ring 33 the section of the shaft 25 situated in the region of the unit is directly cooled. Such cooling prevents at the sealing member 30 evolving of gas or vapours and maintains the sealing member sufficiently compact and airproof against ambient air in the space 27 along the shaft 25.

2

Reverting to FIGURE 1, 40 denotes a spinneret fed from a measuring pump 41. The molten polymer is supplied to the pump 41 through the die 17 of the press 10 by a quantity commensurate to the instantaneous delivery of the pump, which may be obtained in various manners.

In the embodiment shown a compensating "breather" 42 is interposed between the pump 41 and die 17 and comprises a variable volume sealed container operating at internal superatmospheric pressure of tens of atmospheres correspondingly to the operating conditions of the pump 41 and press 10. Where a considerable excess of molten polymer subsists with respect to the pump requirement, the said excess may be recycled from the breather 42 to the feed section A or to one of the decompression sections D, D′ of the press through an adjustable valve 43 associated with the breather. If desired, the breather may be omitted and the recycling valve 43 may be directly connected with the supply conduit of the pump 41.

According to a further embodiment not shown on the drawings, operation of the press may be synchronized with the pump 41 so that the latter is fed at any time with the necessary volume of polymer melt.

The operation of the above described apparatus is as follows.

The molten polymer from the apparatus 18 undergoes a first degasification in the feed section A of the press through conduit 19A. The extent of vacuum in this section (which is filled in part only with polymer and actually operates as a mixer) is never very high, on account of the volume of gas and vapours continuously evolving therein. The section C slows down with respect to section A the flow of polymer, the latter being compressed in the said section C and forming a sealing plug between sections A and D. On flowing from section C to section D the polymer is decompressed and fills section D in part only in order to undergo a mixing action. Since the extent of vacuum in this section is high, the suction conduit 19 is connected with a source of vacuum other than the source of vacuum associated with the conduit 19A. The sections C′ and D′ give rise to a further hydraulic sealing plug and a further decompression-defasifying stage, respectively. In section C″ the polymer is practically totally degasified. Generally, this section is longer than the preceding compression sections because the polymer in the section C″ should hydraulically withstand the pressure drop between the high vacuum in the section D′ and superatmospheric pressure of a few tens of atmospheres which the said section C″ should build up at the inlet to the die 17.

The apparatus according to this invention is more particularly advantageous in manufacturing textile fibers from condensation polymers, such as polyesters, when the apparatus 18 can perform, in part at least, the function of the condensation reactors of the starting monomers, according to a particular aspect of this invention. It then supplies to the section A of the press a fluid mass essentially comprising the polymer and unreacted monomers, the latter being eliminated through conduits 19A and 19, whereas the polymer is brought by the press itself to the necessary conditions (homogeneousness, viscosity, temperature and pressure) for spinning. The apparatus may operate continuously or discontinuously. For instance, in the case of condensation polymers a discontinuous operation appears preferable which, at least with the apparatus employed heretofore, appears to afford a better control of the molecular weight of the polymer; in this case advantageously a pair of apparatus can be provided which alternately feed the press 10. For continuous operation it was found advantageous to employ for the apparatus 18 an extrusion press of the screw type. A suitable press for the purpose is, for instance, the press according to Italian Patent No. 581,932 to applicants, by which a preliminary degasification of the polymer can be effected during melting of the latter; further suitable presses are disclosed by Italian Patents Nos. 644,397 and 657,063 and Italian patent application No. 2003/63 of Jan. 22, 1963. Any of said presses may be combined with press 10 to a single machine in order to directly feed the section A of the press. As far as press 10 is concerned, the embodiment shown on the drawing may undergo various modifications and improvements. So, first of all, more than two screws may be employed, though this may be seldom necessary. Moreover, in certain specific cases, a further degasifying press may be associated with the said press, the former being of the same fundamental arrangement as previously described with reference to the drawings, so as to obtain a first stage (having two or a plurality of screws) followed by a second and even a third stage (having two or a plurality of screws), all these stages being combined, if desired, to a single machine, so as to operate in mutual synchronism and in fully sealed conditions. Moreover, considering the very low viscosity of a number of polymers under spinning conditions, the screw sections in the compression sections C, C′, C″ may comprise a counter-thread of extremely low pitch in order to increase, in a manner known per se, counter-pressure in the said sections. It is further known that certain polymers for textile fabrics are sensitive, in molten condition, to the action of atmospheric air.

Accordingly, the press 10 according to this invention, as well as a press possibly employed as melting device shall be provided with an inlet for an inert gas, mostly nitrogen, advantageously arranged at the rear end of the barrel 13, so that the whole barrel and following devices can be effectively purged by means of the said gas before admitting or forming the polymer.

What I claim is:

1. In an apparatus for manufacturing synthetic textile fibers of the character comprising: a spinneret, a metering pump connected to supply to said spinneret a melt of a linear thermoplastic polymer, a source of said melt providing a feed for said pump, and a degasifying device for the melt interposed on the way of the latter from said source to the pump; the improvement comprising said degasifying device essentially consisting of an extrusion press comprising: a barrel, an extrusion orifice at front end of the barrel communicating with the pump, a pair of extrusion screws closely intermeshing and sealingly rotating in the same sense in the barrel, said screws comprising differentially pitched screw threads defining in the barrel a feed section connected to the source of the melt and at least one decompression section followed by a compression section for the melt, a suction conduit communicating with the decompression section for degasifying the melt processed in the latter, means separating the screw threads in the feed section from the rear end of the barrel to prevent accidental flow of the melt through the rear end, and a suction conduit communicating with the rear end of the barrel to provide a subatmospheric pressure in the feed section through said rear end.

References Cited

UNITED STATES PATENTS

| | | | |
|---|---|---|---|
| 2,178,955 | 11/1939 | Draemann. | |
| 2,278,875 | 4/1942 | Graves | 18—8 X |
| 2,692,405 | 10/1954 | Gayles | 18—8 |
| 2,836,851 | 6/1958 | Holt | 18—12 |
| 3,023,456 | 3/1962 | Palfey. | |
| 3,114,171 | 12/1963 | Colombo | 18—12 |
| 3,145,420 | 8/1964 | Joukainen et al. | 18—8 X |
| 3,146,493 | 9/1964 | Steinle et al. | 18—12 |
| 3,203,046 | 8/1965 | Stein | 18—8 X |
| 3,221,369 | 12/1965 | Vesilind | 18—12 |
| 3,300,811 | 1/1967 | Berger | 18—12 |

WILLIAM J. STEPHENSON, *Primary Examiner.*